(12) United States Patent
Yan et al.

(10) Patent No.: US 9,922,045 B2
(45) Date of Patent: Mar. 20, 2018

(54) DATA MANAGEMENT IN A MULTI-TENANT DISTRIBUTIVE ENVIRONMENT

(71) Applicant: EMC Corporation, Hopkinton, MA (US)

(72) Inventors: Kai Yan, Shanghai (CN); Feng Guo, Shanghai (CN); Dong Xiang, Shanghai (CN); Lin Peng, Shanghai (CN); Ziye Yang, Shanghai (CN)

(*) Notice: Subject to any disclaimer, the term of this patent is extended or adjusted under 35 U.S.C. 154(b) by 76 days.

(21) Appl. No.: 14/211,109

(22) Filed: Mar. 14, 2014

(65) Prior Publication Data

US 2014/0304299 A1   Oct. 9, 2014

(30) Foreign Application Priority Data

Mar. 15, 2013   (CN) .......................... 2013 1 0095687

(51) Int. Cl.
*G06F 17/00* (2006.01)
*G06F 17/30* (2006.01)

(52) U.S. Cl.
CPC .. *G06F 17/30194* (2013.01); *G06F 17/30233* (2013.01)

(58) Field of Classification Search
CPC ......... G06F 17/30536; G06F 17/30289; G06F 17/30463; G06F 17/30165; G06F 21/6227
See application file for complete search history.

(56) References Cited

U.S. PATENT DOCUMENTS

2006/0235715 A1* 10/2006 Abrams ................ G06Q 40/06
                                                             705/1.1
2007/0156842 A1*  7/2007 Vermeulen ........ G06F 17/30212
                                                             709/217

\* cited by examiner

*Primary Examiner* — Truong Vo
(74) *Attorney, Agent, or Firm* — Krishnendu Gupta; Konrad R. Lee (57) ABSTRACT

The present invention relates to a method and apparatus for data management in multi-tenant distributive environment. According to the embodiments of the present invention, a tenant-specific virtual metadata server may be created and registered with a task manager in a job processing system. The virtual metadata server provides a tenant-specific logical file system namespace. Any access to tenant data will be performed via the virtual metadata server. In other words, such virtual metadata server acts as an interface between a tenant terminal and an entity file system. In this way, it may effectively realize isolation of tenant data and enhance data security. Moreover, by using a virtual metadata server rather than physically isolating user data, the embodiments of the present invention may guarantee the efficiency of data sharing while improving the data security.

18 Claims, 6 Drawing Sheets

DATA MANAGEMENT IN A MULTI-TENANT DISTRIBUTIVE ENVIRONMENT

RELATED APPLICATION

This application claims priority from Chinese Patent Application Serial No. CN201310095687.7 filed on Mar. 15, 2013 entitled "Method and Apparatus for Data Management in Multi-Tenant Distributive Environment," the content and teachings of which are hereby incorporated by reference in their entirety.

FIELD OF INVENTION

Embodiments of the present invention generally relate to a distributive computation, and more specifically, for data management in a multi-tenant distributed environment.

BACKGROUND OF INVENTION

Multi-tenant distribution computation has an increasingly wider application. For example, a system such as MapReduce has been applied to numerous cases of mass data analysis. Many such distributed computing systems rely on a distributed file system (DFS) to provide extendable data storage. In operation, data analysis jobs submitted by one or more users are divided into a plurality of map and reduce tasks, by a job server. These tasks are issued to different task servers for execution. The execution process of the job usually involves read/write operation on the data stored in the DFS.

In known prior art related to multi-tenant distributed computation, the security of tenant data becomes a significant challenge. For example, in a common multi-tenant distributed system, different tenants usually share the same DFS. Therefore, data or files belonging to different uses will be stored on the DFS. Moreover, all tenants use the same metadata server of the DFS as an interface to access data. In order to guarantee security and isolation of user data, the DFS may set different access rights for different users to manage the user data. However, a malicious user might steal a password of other tenant or event of the administrator or use other means to illegally obtain access rights to other's data or all data stored on the DFS, therefore compromising on data security of other tenants. Besides, some other limitations might also occur if multiple tenants share a single DFS. For example, the tenants cannot set the same access path and name for their data or files. Therefore, in a multi-tenant case, a file name of one tenant might be in conflict with a file name of other tenant in the same file system namespace.

In order to overcome the above mentioned problem, it has been proposed in the prior art to divide users into individual clusters. However, when the processed job (e.g., data analysis) involves cross-cluster data access, such practice would seriously compromise the performance of the system. It is because in this case, data has to move cross-cluster. In particular, such data move may cause adverse impact on multi-tenant cooperation, sharing of data between different tenants, and similar operations. Therefore as is well known in art, a basic principle in the distributed computing environment is: trying to reduce such data move to the extent possible in order to guarantee performance.

In view of the above, in the distributed computing architecture of the prior art, there are still issues and defects to improve in aspects such as isolation protection of user data and coordination between different users.

SUMMARY OF INVENTION

In view of the above and other potential problems, there exists a need for a solution that manages data more effectively in a multi-tenant distributed environment.

According to one aspect of the disclosure therefore provide a method and apparatus for managing tenant data in a multi-tenant distributed environment. The disclosure relates to receiving, from a tenant, a request for a resource, wherein the request is for processing a job; providing a virtual metadata server specific to the tenant in response to the request, the virtual metadata server providing an independent logical file system namespace for the tenant; and registering the virtual metadata server with a job manager, wherein the job manager is configured for managing job processing by accessing data related to the tenant via the virtual metadata server.

According to further aspect of the present disclosure, there is provided a method and apparatus for managing a distributed job processing. The disclosure relates to registering a tenant-specific virtual metadata server, the virtual metadata server providing an independent logical file system namespace for the tenant; and accessing data related to the tenant via the virtual metadata server while processing a job of the tenant.

The apparatus has a receiving unit configured to receive, from a tenant, a request for a resource for processing a job; a providing unit configured to provide a virtual metadata server specific to the tenant in response to the request, the virtual metadata server providing an independent logical file system namespace for the tenant; and a registration controlling unit configured to register the virtual metadata server with a job manager for managing job processing, such that the job manager accesses data related to the tenant via the virtual metadata server.

According to a yet further aspect of the present invention, there is provided an apparatus for managing a distributed job processing. The apparatus has a registering unit configured to register a tenant-specific virtual metadata server, the virtual metadata server providing an independent logical file system namespace for the tenant; and a data accessing unit configured to access data related to the tenant via the virtual metadata server during processing a job of the tenant.

It would be understood through the following depiction that according to the embodiments of the present invention, a tenant-specific virtual metadata server may be created and registered with a task manager in a job processing system. The virtual metadata server provides a tenant-specific logical file system namespace. Any access to tenant data will be performed via the virtual metadata server. In other words, such virtual metadata server acts as an interface between a tenant terminal and an entity file system. In this way, it may effectively realize isolation of tenant data and enhance data security. Moreover, by using a virtual metadata server rather than physically isolating user data, the embodiments of the present invention may guarantee the efficiency of data sharing while improving the data security.

BRIEF DESCRIPTION OF DRAWINGS

Through reading the following detailed description with reference to the accompanying drawings, the above and other objectives, features and advantages of the embodiments of the present invention will become more comprehensible. In the drawings, several embodiments of the present invention will be illustrated in an exemplary and non-limiting manner, wherein.

In the drawings, the same or corresponding reference numerals refer to the same or corresponding parts.

DETAILED DESCRIPTION OF EMBODIMENTS

Hereinafter, the principle and spirit of the present invention will be described with reference to various exemplary embodiments illustrated in the drawings. It should be understood that these embodiments are provided only to enable those skilled in the art to better understand and further implement the present invention, not intended for limiting the scope of the present invention in any manner.

Figure 1:
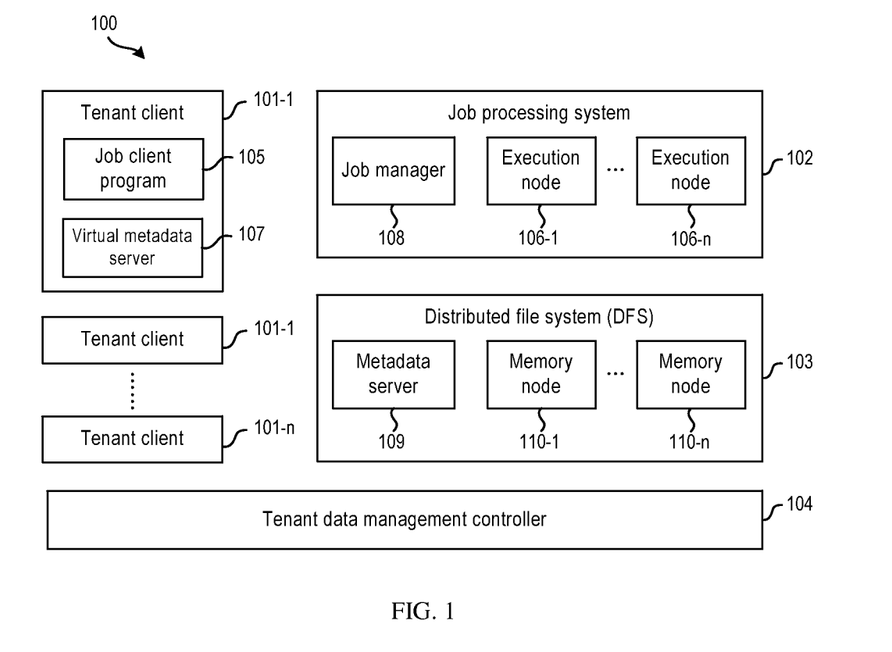
FIG. 1 shows a block diagram of a multi-tenant distributed computing environment according to one exemplary embodiment of the present invention.

Reference is first made to FIG. 1, which shows a block diagram of a multi-tenant distributed environment according to one embodiment of the present invention. As shown in the figure, the environment 100 comprises tenant terminals 101-1, 101-2, . . . , 101-n (generally called "tenant clients 101"), a job processing system 102, a distributed file system (DFS) 103, and a tenant data management controller (shortly as "controller") 104. It should be noted that the number of various components shown in the environment 100 is only illustrative, not intended to limit the scope of the present invention. For example, any number of job processing systems 102 and/or DFS 103 may exist.

According to the embodiments of the present invention, the tenant terminal 101 may be any appropriate computing device associated with a tenant, including, but not limited to, a personal computer (PC), a laptop computer, a tablet computer, a personal digital assistant (PDA), a mobile terminal, etc. A job client program 105 for processing a job may be installed and executed on the tenant terminal 101 (for the sake of clarity, it is only shown in tenant terminal 101-1 in the figure). For example, the job client program may be a MapReduce client for processing a MapReduce job, which, of course, is only an example. During operation, in order to process the job, the tenant terminal 101 may send a request to the controller 104 so as to obtain resources (including memory resource and computing resource) required for processing the job.

According to the embodiments of the present invention, the controller 104 is responsible for controlling and managing running in a multi-tenant distributed environment 100. In response to a request from a tenant terminal 101, the controller 104 may allocate resources to the tenant terminal issuing the request. At this point, in the multi-tenant distributed computing environment 100, the tenant terminal 100 obtaining the resource allocation forms a logical "tenant analysis area." The controller 104 may assign one or more of the memory nodes 110-1, . . . , 110-n (generally called "memory node 110") for the tenant in DFS 103 so as to store and manage data of the tenant. According to the embodiments of the present invention, the memory node 110 may for example be a data storage server.

According to an embodiment of the present invention, the resource request sent from the tenant terminal 101 to the controller 104 may include an indication of service level agreement (SLA). In this case, the controller 104 may assign a memory node 110 for storing tenant data based on the SLA. For example, the data of a tenant with a higher SLA may be stored in a more secure and reliable memory node 110. In particular, according to some embodiments of the present invention, in response to an SLA of a tenant being higher than a predetermined threshold, the data of the tenant may be separately isolated and stored. In other words, such tenant may be provided with a dedicated memory node 110 so as to be used exclusively by the tenant, which will not store data of any other tenant or allow any other tenant to access. Alternatively or additionally, for a tenant with an SLA that is higher than the predetermined threshold, its data may be stored on a memory node with a higher security level, a memory node with a higher security level, for example, having a relatively high reliability, performance, security authentication requirement, and/or a relatively complete network isolation measure, and the like. Other details of allocating resources to the tenant terminal are generally known in the art, which will not be detailed here, which is not the essence of the present disclosure.

After resource allocation, in the prior art, the job processing system 102 (more specifically, the executing nodes 106-1, . . . , 106-n included in the job processing system 102 are generally called "execution node 106") directly communicates with the DFS 103 so as to access the tenant data stored on the memory node 110. However, as analyzed above, such a practice cannot guarantee the security of tenant data. In contrast, according to the embodiments of the present invention, the controller 104 provides a virtual metadata server 107 on the tenant terminal 101 in response to a resource request from the tenant. The virtual metadata server 107 for example may be a process or application running on the tenant terminal 101. According to the embodiments of the present invention, the virtual metadata server 107 is generally specific to the tenant. The term "specific" used here means the provided virtual metadata server 107 is only associated with the tenant of the tenant terminal 101, and cannot be used by any other tenant.

According to the embodiments of the present invention, the virtual metadata server 107 provided by the controller 104 for the tenant arranges for an independent or isolated logical file system namespace for the tenant. The logical file system namespace is only used by the tenant associated with the virtual metadata server 107. In the logical file system namespace, the tenant may use a logical address to access related data. To this end, the virtual metadata server 107 for example may maintain a list of logical addresses for data (e.g., one or more documents) related to the associated tenants and their jobs in the logical file system namespace.

It would be appreciated that the logical addresses in the logical file system namespace provided by the virtual metadata server 107 are not always consistent with the actual storage addresses of the data in the DFS 103. Therefore, the controller 104 may create an address mapping associated with the tenant, for converting logical address in the logical file system namespace provided by the virtual metadata server 107 specific to the tenant into an actual address in a global file system namespace of the DFS 103. It would be appreciated that since the controller 104 understands the naming rules for the logical address of the virtual metadata server 107 and the actual address of the DFS 103, the controller 104 may realize such an address mapping.

It should be noted that such an address mapping is not essential. For example, as mentioned above, for a tenant with an SLA higher than a predetermined threshold, its data may be separately stored in an independent memory node 110. In this case, the logical address provided by the virtual metadata server 107 may be consistent with the global actual address in the DFS 103. At this point, no address mapping is required.

Continue to refer to FIG. 1. According to an embodiment of the present invention, all data access related to a tenant and its job should be performed through a virtual metadata server specific to the tenant. To this end, the controller 104 may also need to register a virtual metadata server 107 with a job manager 108 in the job processing system 102. In response to an indication of the controller 104, the job manager 108, for example, may complete registration of the virtual metadata server 107 specific to the tenant through creating and maintaining a mapping relationship between the tenant and/or tenant terminal 101 and the virtual metadata server 107. In particular, since the virtual metadata server 107 is only associated with one specific tenant/tenant terminal 101, such a mapping relationship is a one-to-one mapping. In other words, for each tenant, the job manager may determine a unique virtual metadata server 107 associated with the tenant through looking up the mapping based on identity information of the tenant.

In addition, the job manager 108 may also be responsible for performing necessary authentication and examination on the tenant and/or tenant terminal 101, dispatching the job from the tenant to appropriate one or more execution nodes 106 for execution, and/or tracking execution situation of job execution, and etc. One example of the job manager 108 is, for example, a Job Tracker in the Hadoop system. These are well known in the art, and will not be detailed here, which will be outside the scope of the embodiments of the present invention.

In operation, when the tenant wishes/requires/needs to process a job, he/she may use the tenant terminal 101 to request job processing from the job manager 108 in the job processing system 102, thereby submitting the to-be-processed job to the job processing system 102. The job manager 108 may connect the virtual metadata server 107 to determine a storage location of the data associated to the to-be-executed tenant job. In some embodiments, in order to guarantee the forward compatibility of the job manager 108, the virtual metadata server 107 may provide a DFS interface. At this point, the job manager 108 may interact with the virtual metadata server 107 via these DFS interfaces, just like interacting with an entity metadata server 109 of the DFS 103.

As a response, the virtual metadata server 107 determines a logical address of the job-involved data in the logical file system namespace and provides the logical address to the entity metadata server 109 of the DFS 103. The metadata server 109 of the DFS 103 is responsible for managing storage and access of data on the memory node 110 and in turn communicates with the controller 104 so as to forward the data from the virtual metadata server 107 to the controller 104. Then, the controller 104 determines an actual address of the data in the DFS 103 global file system namespace. For example, in the aforementioned alternative embodiment, the logical address of the data may be converted into the global actual address in the DFS 103 by means of the address mapping. Alternatively, if the controller 104 determines that the SLA of the current tenant is higher than the predetermined threshold and therefore has a dedicated data storage node 110, it may directly use the virtual address as the actual address.

After the actual address representing the data storage position is determined, the controller 104 may send the actual address back to the job manager 108 in the job processing system 103 via the virtual metadata server 107. The job manager 108 therefore may determine the actual storage location of data and realize access to the data. In particular, according to some alternative embodiments, the job manager 108 may determine dispatch of the job to which execution nodes 106 based on the storage location of data. For example, the job manager 108 may select an execution node 106 located on the same physical machine as the storage node 103 that stores job data to execute the job. In this manner, extra data communication and movement may be avoided.

During the execution period of the whole job, when the job manager 108 needs to access tenant data, it always implements data access via the virtual metadata server 107 specific to the tenant. In other words, the virtual metadata server 107 not only provides an isolated and independent logical file system namespace for the tenant, but also acts as an interface or bridge between the DFS 103 and the tenant client 101 and job manager 108. In this way, it may guarantee isolated access to tenant data thereby enhancing data security.

According to some embodiments of the present invention, in order to further improve the operation efficiency, besides the DFS interface as depicted above, the controller 104, while providing the virtual metadata server 107, may also configure it to implement at least a part of functions of the entity metadata server 109 of the DFS 103. For example, according to some embodiments, a function similar to the "list" operation of the metadata server may be implemented on the virtual metadata server 107, thereby further reducing the communication of the tenant terminal 101 and the job manager 108 with the DFS 103.

Besides, embodiments of the present invention may support easy data sharing between different tenants. For example, consider that a tenant (denoted as Tenant A) wishes to share data associated with him/her (for example, in the form of one or more documents) with another tenant (denoted as Tenant B). At this point, tenant A may use his/her tenant terminal 101 to send a request for sharing data to the controller 104, which request contains a logical address of the to-be-shared data in the logical file system namespace provided by the virtual metadata server 107 specific to tenant A. As a response, the controller 104 may configure the virtual metadata server 107 specific to tenant B so as to add the logical address of the to-be-shared data in the logical file namespace provided thereby.

For example, the controller 104 may first determine the actual address of the data based on the logical address of the to-be-shared data provided by the tenant A (which may leverage the address mapping). Subsequently, the controller 104 may determine the logical address of the actual address in the logical file system namespace of the tenant B based on the naming rule in the logical file system name space provided by the metadata server 107 specific to tenant B. Therefore, the controller 104 may configure the virtual metadata server 107 specific to tenant B, so as to add the logical address. In this way, the job manager 108 and/or tenant B's tenant terminal 101 may use the virtual metadata server 107 specific to tenant B to access tenant A's shared data.

Moreover, as mentioned above, in some alternative embodiments, the controller 104 may need to implement a mapping between logical addresses and actual addresses. In such embodiments, the controller 104 may also add a mapping entry associated with the to-be-shared data in an address mapping associated with tenant B so as to be capable of converting the logical address of the data in the logical file system namespace of tenant B into a global actual address in DFS 103.

It would be appreciated that according to embodiments of the present invention, isolation and protection of tenant data is implemented by virtual of a virtual metadata server specific to each tenant. In physical implementation, the tenant data can be still stored by a single DFS. By means of this virtual or logical isolation, instead of physical isolation, cross-sharing of data may be assured while enhancing the data security, and further, the execution efficiency of jobs such as data analysis may be further enhanced.

Alternatively, in order to facilitate data sharing between different tenants, according to some embodiments of the present invention, data of all user tenants may be managed and stored by a single DFS 103. In this way, data migration that might occur in data sharing may be reduced, thereby further enhancing the performance of the whole system.

Figure 2:
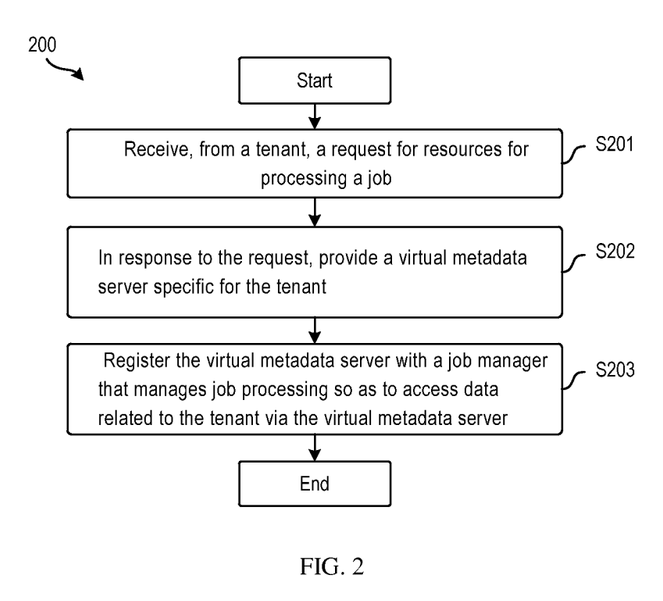
FIG. 2 shows a flow chart of a method for managing tenant data in multi-tenant distributed environment according to one exemplary embodiment of the present invention.

Now reference is made to FIG. 2, which shows a flow chart of a method 200 for managing tenant data in a multi-tenant distributed environment according to an exemplary embodiment of the present invention. The method 200 may be executed by an apparatus residing on the above tenant data management controller as depicted above with reference to FIG. 1 or associated therewith in other manner.

After the method 200 starts, step S201 involves, receiving, from a tenant, a request for a resource for processing a job. Next, at step S202, in response to the request, provide a virtual metadata server specific to the tenant, the virtual metadata server providing an independent logical file system namespace for the tenant. Finally, the method 200 proceeds to step S203, where the virtual metadata server is registered with a job manager that manages job processing, such that the job manager accesses the data related to the tenant via the virtual metadata server.

As mentioned above, in some alternative embodiments, the method 200 may further include creating an address mapping (alternatively referred to as address map) associated with the tenant, wherein the address mapping is for converting a logical address in the logical file system namespace into an actual address in a global file system namespace of a distributed file system that stores tenant data.

In some alternative embodiments, the method 200 further includes receiving a logical address of data from the virtual metadata server; converting the logical address into the actual address by means of the address map; and providing the actual address to the job manager via the virtual metadata server.

In some alternative embodiments, the method 200 may further include receiving a request for sharing data with the tenant from another tenant; in response to the request, configuring the virtual metadata server specific to the tenant so as to add a logical address of the to-be-shared data in the logical file system namespace. In these embodiments, the method 200 may also include adding a mapping entry associated with the to-be-shared data in an address map associated with the tenant, for converting the logical address of the to-be-shared data into an actual address in a global file system namespace of a distributed file system that stores tenant data.

In some alternative embodiments, the request from the tenant as received in step S201 that may contain an indication of service level agreement (SLA). In these embodiments, the method 200 may also include assigning a memory node that stores data associated with the tenant based on the SLA. In particular, assigning the memory node based on the SLA for example may include storing data associated with the tenant into a dedicated memory node or a memory node with a higher security level in response to the SLA being higher than a predetermined threshold.

According to some embodiments, data associated with multiple different tenants may be stored in a single distributed file system. Alternatively or additionally, in step S202, providing the virtual metadata server specific to the tenant includes configuring the virtual metadata to execute at least a part of functions of the metadata server of the distributed file system for storing tenant data.

The method 200 ends after step S203.

Figure 3:
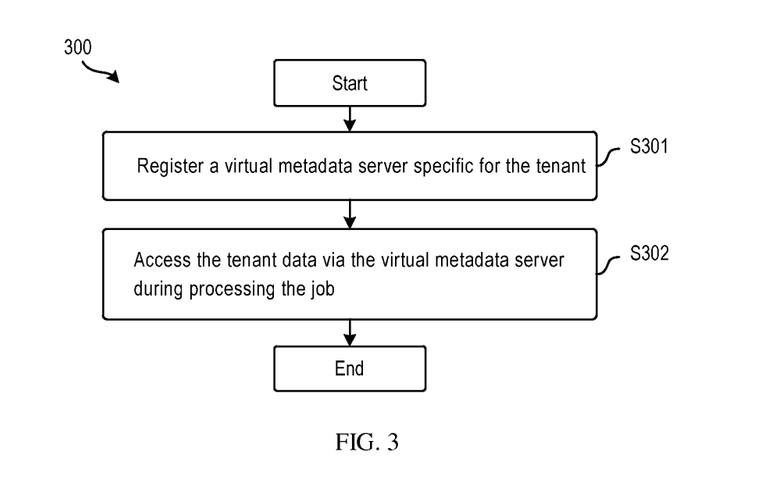
FIG. 3 shows a flow chart of a method for managing distributed job processing according to one exemplary embodiment of the present invention.

Now, reference is made to FIG. 3, which shows a flow chart of a method 300 for managing distributed job processing according to embodiments of the present invention. The method 300 may reside on the above job manager 108 as depicted above with reference to FIG. 1 or associated therewith in other manner.

After the method 300 starts, step S301 includes, registering a virtual metadata server specific to a tenant, the virtual metadata server providing an independent logical file system namespace for the tenant. Next, at step S302, during processing a job of the tenant, access data related to the tenant via the virtual metadata server.

According to some alternative embodiments, the operation at step S302 may include receiving a request for processing a job from the tenant; in response to the request, requesting a storage location of data associated with the job with the virtual metadata server; and receiving, from the virtual metadata server, an actual address of the data associated with the job in a global file system namespace of a distributed file system that stores tenant data, the actual address representing the storage location. In these embodiments, the method 300 may further include assigning an execution node for executing the job of the tenant based on the actual address. Method 300 terminates after step S302.

It should be noted that for the sake of clarity and convenient depiction, alternative steps of the methods exist and are not shown in the flow charts of FIGS. 2 and 3. It should be understood that various operations and features as depicted above with reference to FIG. 1, fall within the scope of the present disclosure and are applicable to methods 200 and 300.

Figure 4:
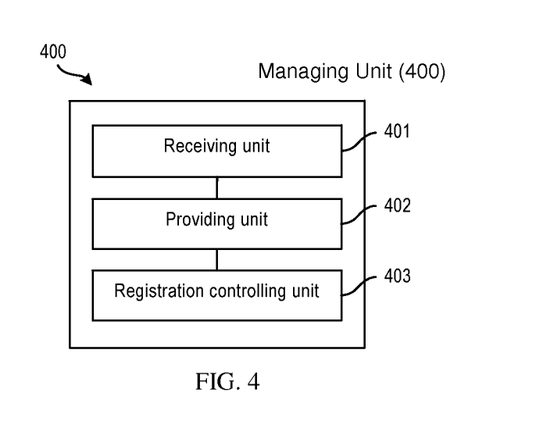
FIG. 4 shows a block diagram of an apparatus for managing tenant data in a multi-tenant distributed environment according to one exemplary embodiment of the present invention.

Now reference is made to FIG. 4, which shows a block diagram of an apparatus 400 for managing tenant data in a multi-tenant distributed environment according to the embodiments of the present invention. According to the embodiments of the present invention, the apparatus 400 may reside on the above tenant data management controller 104 as depicted above with reference to FIG. 1 or associated therewith in other manner. As illustrates in the FIG. 4, each of receiving unit 401, providing unit 402 and registration controlling unit 403 are shown as independent units, and it should be obvious to one skilled in the art that these unit may be provided separately as illustrated above or may be combined in groups such that the combined units, partially or fully, and the combined units may perform the tasks of the units combined.

As shown in the figure, the apparatus 400 comprises: a receiving unit 401 configured to receive, from a tenant, a request for a resource for processing a job; a providing unit 402 configured to provide a virtual metadata server specific to the tenant in response to the request, the virtual metadata server providing an independent logical file system namespace for the tenant; and a registration controlling unit 403 configured to register the virtual metadata server with a job manager for managing job processing, such that the job manager accesses data related to the tenant via the virtual metadata server. In a separate embodiment, if the receiving unit and providing unit are combined into a single unit, the such a unit will be responsible for receiving, from a tenant, a request for a resource for processing a job; and providing a virtual metadata server specific to the tenant in response to the request, the virtual metadata server providing an independent logical file system namespace for the tenant. If the registration controlling unit is also combined with the receiving unit and the providing unit, the in addition the combined unit will also perform the task of registering the virtual metadata server with a job manager for managing job processing, such that the job manager accesses data related to the tenant via the virtual metadata server. Therefore, it should be obvious to one skilled in the art that these units may be operated independently or may be combined into one or more unit to achieve the tasks allocated to these units. Further these units may be in the form of hardware or software or a combination thereof.

In some alternative embodiments, the apparatus 400 may further include an address mapping unit configured to create an address mapping associated with the tenant, the address mapping being for converting a logical address in the logical file system namespace into an actual address in a global file system namespace of a distributed file system that stores tenant data. In these embodiments, the apparatus 400 may also include an address receiving unit configured to receive a logical address of data from the virtual metadata server; an address converting unit configured to convert the logical address into the actual address by means of the address mapping; and an address providing unit configured to provide the actual address to the job manager via the virtual metadata server. Again, it should be obvious that these units may act independently or may be combined into one or more units with the other units disclosed above.

In some alternative embodiments, the apparatus 400 may further include a share request receiving unit configured to receive a request for sharing data with the tenant from another tenant; a share management unit configured to in response to the request, configure the virtual metadata server specific to the tenant so as to add a logical address of the to-be-shared data in the logical file system namespace. In these embodiments, the apparatus 400 may also include an address mapping management unit configured to add a mapping entry associated with the to-be-shared data in an address mapping associated with the tenant, for converting the logical address of the to-be-shared data into an actual address in a global file system namespace of a distributed file system that stores tenant data. Again, it should be obvious that these units may act independently or may be combined into one or more units with the other units disclosed above.

In some alternative embodiments, the request from the tenant contains an indication of a service level agreement (SLA). In these embodiments, the apparatus 400 may also include a memory node assigning unit configured to assign a memory node that stores data associated with the tenant based on the SLA. In these embodiments, the memory node assigning unit for example may include a unit configured to store data associated with the tenant into a dedicated memory node or a memory node with a higher security level in response to the SLA being higher than a predetermined threshold.

In some alternative embodiments, data associated with multiple different tenants may be stored in a single distributed file system. Alternatively or additionally, the providing unit 402 may include a unit configured to configure the virtual metadata server to execute at least a part of functions of the metadata server of the distributed file system for storing tenant data.

Figure 5:
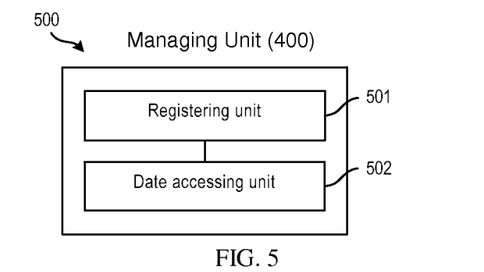
FIG. 5 shows a block diagram of an apparatus for managing distributed job processing according to one exemplary embodiment of the present invention.

Reference is now made to FIG. 5, which shows a block diagram of an apparatus 500 for managing distributed job processing according to embodiments of the present invention. According to embodiments of the present invention, the apparatus 500 may reside on the above job manager 108 as depicted above with reference to FIG. 1 or associated therewith in other manner.

As shown in the figure, the apparatus 500 includes a registering unit 501 configured to register a tenant-specific virtual metadata server, the virtual metadata server providing an independent logical file system namespace for the tenant; and a data accessing unit 502 configured to access data related to the tenant via the virtual metadata server during processing a job of the tenant.

In some alternative embodiments, the data accessing unit 502 may include a job processing request receiving unit configured to receive a request for processing a job from the tenant; a data location request unit configured to request storage location of data associated with the job with the virtual metadata server in response to the request; and a data location receiving unit configured to receive, from the virtual metadata server, an actual address of the data associated with the job in a global file system namespace of a distributed file system that stores tenant data, the actual address representing the storage location. In these embodiments, the apparatus 500 may further comprise a job assigning unit configured to assign an execution node for executing the job of the tenant based on the actual address.

For the sake of clarity, alternative units included in apparatuses 400 and 500 and sub-units included within each unit are not shown in FIGS. 4 and 5. However, it should be noted that various features as depicted above with reference to FIG. 1 are likewise applicable to apparatuses 400 and 500, which will not be detailed here. It should be obvious that these units and sub-units may perform their tasks independently or may be combined into one or more units with the other units to perform the respective tasks. If all the units are combined into a single unit, then the single unit will perform all the tasks. It should also be noted here that the units and/or sub-units may be represented entirely by software or hardware or a combination thereof.

It should be understood that the apparatuses 400 and 500 may be implemented in various manners. For example, in some embodiments, the apparatuses 400 and 500 may be implemented using software and/or firmware. For example, apparatuses 400 and 500 may be implemented as computer program products embodied on the computer readable medium, wherein each unit is a program module whose function is implemented through the computer instruction. Alternatively or additionally, the apparatuses 400 and 500 may be implemented partially or completely based on hardware. For example, the apparatuses 400 and 500 may be implemented as an integrated circuit (IC) chip, a dedicated integrated circuit (ASIC) or a system on chip (SOC). Other manners that are currently known or may be developed in the future are also feasible, and the scope of the present disclosure is not limited thereto.

Figure 6:
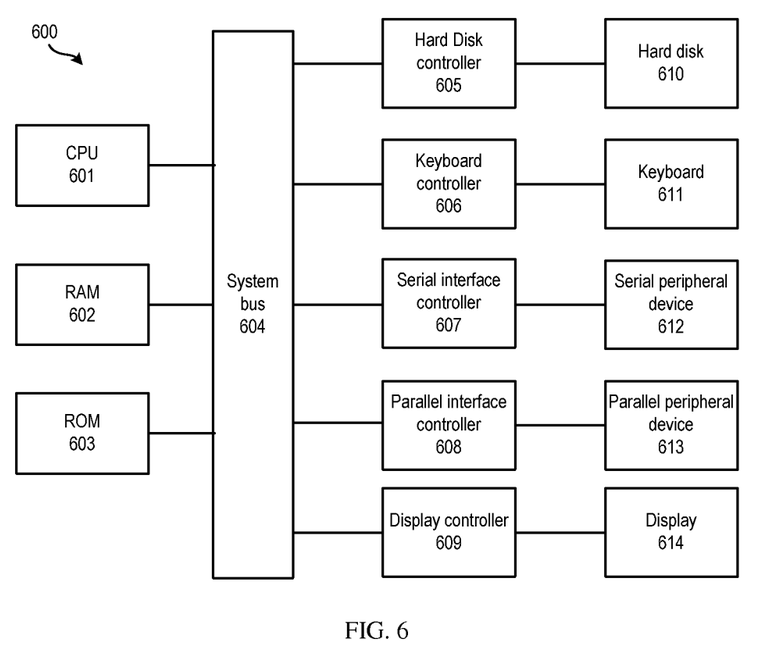
FIG. 6 illustrates a block diagram of a computer system that is adapted to be used with the embodiments of the present invention.

Reference is now made to FIG. 6, which illustrates a schematic block diagram of a computer system that is adapted to implement embodiments of the present invention. The computer system as shown in FIG. 6 includes a CPU (Central Processing Unit) 601, a RAM (Random Access Memory) 602, a ROM (Read Only Memory) 603, a system bus 604, a hard disk controller 605, a keyboard controller 606, a serial interface controller 607, a parallel interface controller 608, a monitor controller 609, a hard disk 610, a keyboard 611, a serial peripheral device, a parallel peripheral device 613 and a monitor 614. Among these components, connected to the system bus 604 are the CPU 601, the RAM 602, the ROM 603, the hard disk controller 605, the keyboard controller 606, the serial interface controller 607, the parallel interface controller 608 and the monitor controller 609. The hard disk 610 is coupled to the hard disk controller 605; the keyboard 611 is coupled to the keyboard controller 606; the serial peripheral device 612 is coupled to the serial interface controller 607; the parallel peripheral device 613 is coupled to the parallel interface controller 608; and the monitor 614 is coupled to the monitor controller 609. It should be understood that the structural block diagram in FIG. 6 is shown only for illustration purpose, and is not intended to limit the scope of the present invention. In some cases, some devices may be added or reduced as required.

As above mentioned, the apparatuses 400 and 500 may be implemented through hardware, for example, chip, ASIC, SOC, etc. Such hardware may be integrated into the computer system 600. Besides, embodiments of the present invention may also be implemented in a form of a computer program product. For example, the methods of the present invention may be unexceptionally implemented through a computer program product. This computer program product may be stored in RAM 604, ROM 604, hard disk 610 and/or any suitable storage medium as illustrated in FIG. 6, or downloaded to the computer system 600 from a suitable location in the network. The computer program product may include a computer code portion having a program instruction that may be executed through a suitable processing device (for example, CPU 601 in FIG. 6). The program instruction at least may comprise an instruction for implementing the steps of the methods of the present invention.

Embodiments of the present invention can be implemented with software, hardware or the combination thereof. The hardware part can be implemented by a special logic; the software part can be stored in a memory and executed by a proper instruction execution system such as a microprocessor or a design-specific hardware. A person with ordinary skill in the art may understand that the above method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The system of the present invention may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

It should be noted that although a plurality of modules or sub-modules of the apparatuses have been mentioned in the above detailed depiction, such partitioning is merely non-compulsory. In actuality, according to the embodiments of the present invention, the features and functions of the above described two or more units may be embodied in one unit. In turn, the features and functions of the above described one unit may be further embodied in more units.

Besides, although operations of the present methods are described in a particular order in the drawings, it does not require or imply that these operations must be performed according to this particular sequence, or a desired outcome can only be achieved by performing all shown operations. On the contrary, the execution order for the steps as depicted in the flowcharts may vary and the sequence of execution may be changed. Additionally or alternatively, some steps may be omitted, a plurality of steps may be merged into one step, or a step may be divided into a plurality of steps for execution.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. A method for managing tenant data in a multi-tenant distributed environment, the method comprising:
   receiving, from a tenant, a request for resources, the request for resources intended for processing a job;
   in response to the request, providing a virtual metadata server within a tenant client specific to the tenant, the virtual metadata server providing an independent logical file system namespace for the tenant, wherein the independent logical file system namespace is enabled to isolate the tenant data from other data stored within the multi-tenant distributed environment;
   wherein the virtual metadata server is enabled to receive requests to modify which portions of data within the multi-tenant distributed environment are available to the tenant; and
   registering the virtual metadata server with a job manager, the job manager configured to access data related to the tenant via the virtual metadata server;
   creating an address map associated with the tenant, wherein the address map converts a logical address in the logical file system namespace into an actual address in a global file system namespace of a distributed file system that stores the tenant data.

2. The method according to claim 1, further comprising:
   receiving the logical address for the data from the virtual metadata server;
   converting the logical address into the actual address by means of the address map; and
   providing the actual address to the job manager via the virtual metadata server.

3. The method according to claim 1, further comprising:
   receiving, from a second tenant, a request for sharing data with the tenant; and
   in response to the request received from the second tenant, configuring the virtual metadata server specific to the tenant to add a logical address of to-be-shared data in the logical file system namespace.

4. The method according to claim 3, further comprising:
   adding a mapping entry associated with the to-be-shared data in the address map associated with the tenant, for converting the logical address of the to-be-shared data into an actual address in a global file system namespace of a distributed file system that stores the tenant data.

5. The method according to claim 1, the method further comprising:
assigning a memory node for storing data associated with the tenant based on a service level agreement (SLA), wherein the request from the tenant contains an indication of the SLA.

6. The method according to claim 5, further comprising:
in response to the SLA being greater than a predetermined threshold, storing the data associated with the tenant on at least one of a dedicated memory node and on a memory node associated with a higher security level.

7. The method according to claim 1, wherein data associated with multiple different tenants is stored into a single distributed file system.

8. The method according to claim 1, wherein providing the virtual metadata server specific to the tenant further comprises:
configuring the virtual metadata server to execute at least a part of a metadata server of a distributed file system that stores the tenant data.

9. A method for managing distributed job processing, the method comprising:
registering a virtual metadata server within a tenant client specific to a tenant, the virtual metadata server providing an independent logical file system namespace for the tenant, wherein the independent logical file system namespace is enabled to isolate the tenant data from other data stored within the multi-tenant distributed environment;
wherein the virtual metadata server is enabled to receive requests to modify which portions of data within the multi-tenant distributed environment are available to the tenant; and
accessing data related to the tenant via the virtual metadata server while processing a job of the tenant
creating an address map associated with the tenant, wherein the address map converts a logical address in the logical file system namespace into an actual address in a global file system namespace of a distributed file system that stores the tenant data.

10. The method according to claim 9, wherein accessing data related to the tenant via the virtual metadata server further comprises:
receiving, from the tenant, a request for processing the job;
in response to the request, requesting a memory location of the data related to the job with the virtual metadata server; and
receiving, from the virtual metadata server, an actual address of the data related to the job in a global file system namespace of a distributed file system that stores tenant data, wherein the actual address representing the memory location.

11. The method according to claim 10, further comprising:
assigning an execution node for executing the job of the tenant based on the actual address.

12. An apparatus for managing tenant data in a multi-tenant distributed environment, the apparatus comprising:
a managing unit wherein the managing unit is configured to receive, from a tenant, a request for resources for processing a job;
in response to the request, provide a virtual metadata server within a tenant client specific to the tenant, the virtual metadata server providing an independent logical file system namespace for the tenant wherein the independent logical file system namespace is enabled to isolate the tenant data from other data stored within the multi-tenant distributed environment;
configured to create an address map associated with the tenant, wherein the address mapping converts a logical address in the logical file system namespace into an actual address in a global file system namespace of a distributed file system that stores tenant data;
wherein the virtual metadata server is enabled to receive requests to modify which portions of data within the multi-tenant distributed environment are available to the tenant; and
register the virtual metadata server with a job manager wherein the job manager is configured to accesses data related to the tenant via the virtual metadata server.

13. The apparatus according to claim 12, further configured to
receive the logical address of the data from the virtual metadata server;
convert the logical address into the actual address by means of the address mapping; and
provide the actual address to the job manager via the virtual metadata server.

14. The apparatus according to claim 12, further configured to receive, from a second tenant, a request for sharing data with the tenant; and
in response to the request received from the second tenant, configure the virtual metadata server specific to the tenant to add a logical address of to-be-shared data in the logical file system namespace, and adding a mapping entry associated with the to-be-shared data in the address map associated with the tenant, for converting the logical address of the to-be-shared data into an actual address in a global file system namespace of a distributed file system that stores tenant data.

15. The apparatus according to claim 12, wherein the request from the tenant contains an indication of a service level agreement (SLA), the apparatus configured to assign a memory node for storing data related to the tenant based on the SLA, and in response to the SLA being greater than a predetermined threshold, store the data associated with the tenant on at least one of a dedicated memory node and on a memory node associated with a higher security level.

16. The apparatus according to claim 12, wherein data associated with multiple different tenants is stored into a single distributed file system.

17. The apparatus according to claim 12, further configured to configure the virtual metadata server to execute at least a part of a metadata server of a distributed file system that stores tenant data.

18. An apparatus for managing distributed job processing, the apparatus comprising a managing unit configured to register a virtual metadata server within a tenant client specific to a tenant, the virtual metadata server providing an independent logical file system namespace for the tenant;
during processing a job of the tenant, access data related to the tenant via the virtual metadata server, wherein the virtual metadata server provides an independent logical file system namespace enabled to isolate the data from other data stored within the multi-tenant distributed environment;

wherein the virtual metadata server is enabled to receive requests to modify which portions of data within the multi-tenant distributed environment are available to the tenant;

receiving, from the tenant, a request for processing a job; in response to the request, request a memory location of the data related to the job with the virtual metadata server, and receiving, from the virtual metadata server, an actual address of the data related to the job in a global file system namespace of a distributed file system that stores tenant data, the actual address representing the memory location, and assign an execution node for executing the job of the tenant based on the actual address;

creating an address map associated with the tenant, wherein the address map converts a logical address in the logical file system namespace into an actual address in a global file system namespace of a distributed file system that stores the tenant data.

\* \* \* \* \*